United States Patent
Kling et al.

(10) Patent No.: US 8,072,171 B2
(45) Date of Patent: Dec. 6, 2011

(54) MOTOR CONTROL

(75) Inventors: Daniel Kling, Västerås (SE); Gunnar Johansson, Skultuna (SE)

(73) Assignee: ABB AB, Västerås (SE)

( * ) Notice: Subject to any disclaimer, the term of this patent is extended or adjusted under 35 U.S.C. 154(b) by 451 days.

(21) Appl. No.: 12/298,102

(22) PCT Filed: Apr. 17, 2007

(86) PCT No.: PCT/SE2007/000360
§ 371 (c)(1),
(2), (4) Date: Oct. 22, 2008

(87) PCT Pub. No.: WO2007/123458
PCT Pub. Date: Nov. 1, 2007

(65) Prior Publication Data
US 2009/0096403 A1    Apr. 16, 2009

(30) Foreign Application Priority Data
Apr. 24, 2006 (SE) .................. 0600889

(51) Int. Cl.
*H02P 27/00* (2006.01)
(52) U.S. Cl. ........ 318/504; 318/494; 318/599; 318/606; 318/607; 318/608

(58) Field of Classification Search .............. 318/504, 318/494, 599, 606, 607, 608
See application file for complete search history.

(56) References Cited

U.S. PATENT DOCUMENTS

| | | | |
|---|---|---|---|
| 5,383,107 A * | 1/1995 | Hopkins et al. | 363/41 |
| 5,504,667 A * | 4/1996 | Tanaka et al. | 363/37 |
| 6,542,390 B2 * | 4/2003 | Bixel | 363/71 |
| 6,930,459 B2 | 8/2005 | Fritsch et al. | |

FOREIGN PATENT DOCUMENTS

| | | |
|---|---|---|
| GB | 2403855 A | 1/2005 |
| WO | WO-97/29541 A1 | 8/1997 |
| WO | WO-01/48903 A1 | 7/2001 |

OTHER PUBLICATIONS

PCT/IB/373—International Preliminary Report on Patentability—Oct. 28, 2008.
PCT/ISA/237—Written Opinion of the International Searching Authority—Jul. 6, 2007.
PCT/ISA/210—International Search Report—Jul. 6, 2007.

* cited by examiner

*Primary Examiner* — Walter Benson
*Assistant Examiner* — David Luo
(74) *Attorney, Agent, or Firm* — Venable LLP; Eric J. Franklin

(57) ABSTRACT

A method of controlling a current of a three-phase electric motor with a three-phase controller. The firing angles are adjusted so as to leave a range of firing angles in which DC components appear.

9 Claims, 3 Drawing Sheets

US 8,072,171 B2

MOTOR CONTROL

CROSS-REFERENCE TO RELATED APPLICATIONS

This application claims priority to Swedish patent application number 0600889-0 filed 24 Apr. 2006 and is the national phase under 35 U.S.C. §371 of PCT/SE2007/000360 filed 17 Apr. 2007.

FIELD OF INVENTION

The present invention relates generally to a method for reducing the influence of DC components in the load current of an electric motor.

BACKGROUND

Starter devices for electric motors, such as asynchronous motors, comprising semi-conductor elements have been used for some time. By controlling the voltage applied to the motor in one, two, or three of the phases a reduction of the torque and current provided to the motor is achieved during start and stop operation. The phase gating or firing angle is used as a measure of the amount of energy supplied to the motor. Current half-cycles of alternate polarity flow through the load which is connected to the output of the three-phase controller with there being a time interval during which no current flows and which is determined by the phase gating between each two successive current half-cycles.

Three-phase controllers are normally provided with three pairs of semi-conductor elements, such as thyristors, which are connected back-to-back in parallel, so called anti-parallel configuration. Since the thyristors become the cost-determining factor, three-phase controllers having only two pairs of thyristors are also used. In these so-called two-phase three-phase controllers, the remaining third phase is in the form of a conductor, which cannot be switched.

However, when the control is limited to only two of the three phases, unwanted effects in the form of for example a DC component in the motor current appear. During start up operation a smooth and gradually increased torque is desired but this DC component appearing during start up sometimes creates a retarding or oscillating torque. This can be both disturbing and damaging to the controller system, the electric motor, and to the motor driven load.

The U.S. Pat. No. 6,930,459 B2 discloses a method for reducing the influence of a DC current component in the load current of an asynchronous motor by applying two different control methods. It has proven to be difficult to entirely remove the DC component by applying control methods since the control point is unstable and the DC current appears momentarily.

SUMMARY OF THE INVENTION

An object of the present invention is to provide a method for eliminating or at least reducing the effects of a DC component in a two-phase three-phase controller.

The invention is based on the realisation that when there is a possibility of DC components appearing in current supplied to the electric motor, the firing angles of semiconductors provided in the phases are adjusted so as to remove the DC component.

According to a first aspect of the invention there is provided method.

By simply adjusting the firing angles so as to leave a range of firing angles in which the DC components appear, no complex control is required. Thereby a method of controlling a motor is provided which, in an easy and convenient way, solves the problem with DC components appearing in two-phase three-phase controller systems.

In a preferred embodiment, a range of firing angles in which DC components in current supplied to the electric motor are possible is determined prior to adjusting the firing angles so as to leave said range of firing angles. This limits the method to part of the operation range, increasing efficiency thereof.

In yet a preferred embodiment, DC components are searched for during operation, and, subsequently to having found a DC component, the firing angles are adjusted so as to leave a range of firing angles in which the DC components appear. This limits the inventive adjustment of firing angles to cases wherein DC components actually appear.

According to a second aspect of the invention there is provided a computer program product directly loadable into the internal memory of a controller for a three-phase motor.

BRIEF DESCRIPTION OF DRAWINGS

The invention is now described, by way of example, with reference to the accompanying drawings, in which.

DETAILED DESCRIPTION OF PREFERRED EMBODIMENTS

In the following a detailed description of a preferred embodiment of the present invention will be given.

Figure 1:
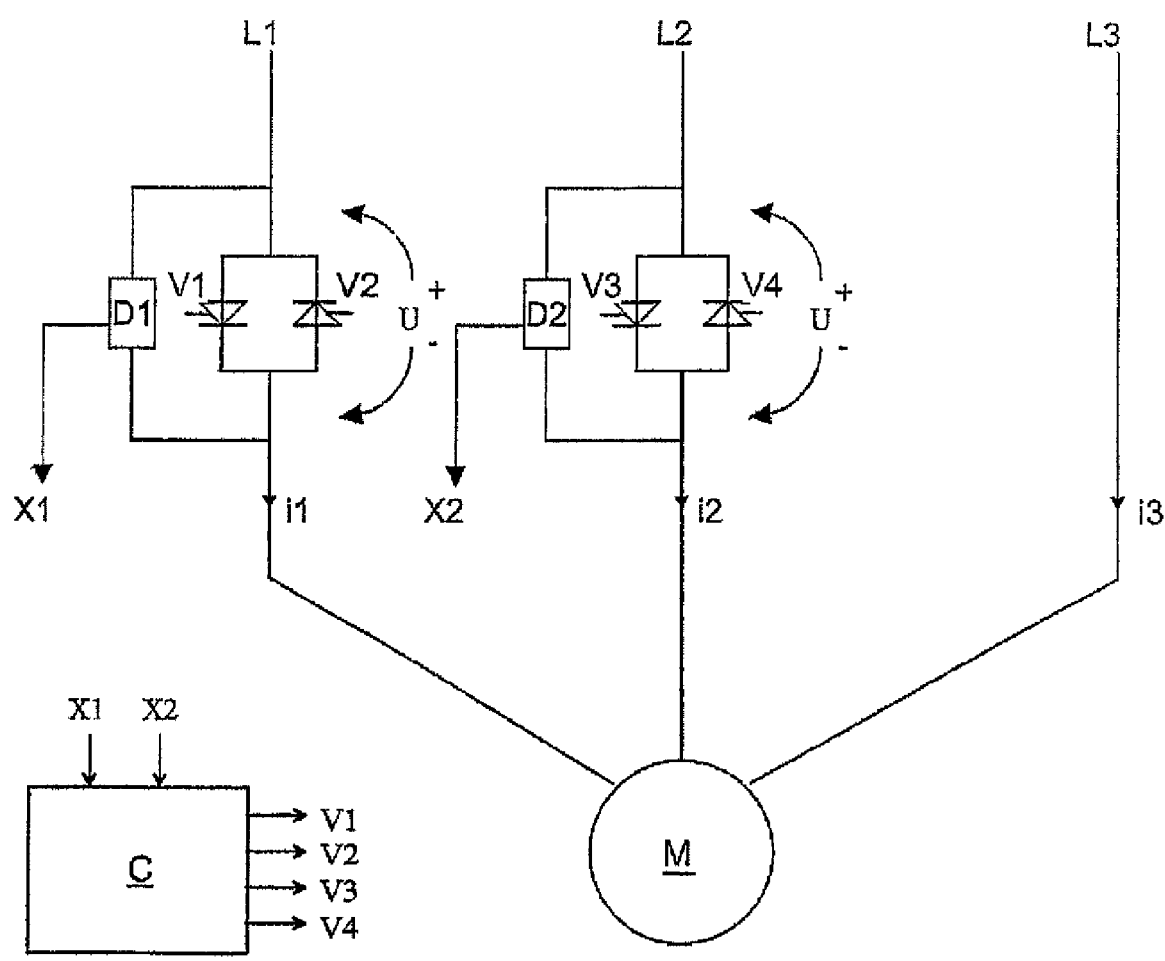
FIG. 1 shows a diagram of the drive stage and a three-phase electric motor.

In FIG. 1 there is shown three phase lines L1, L2, and L3 connected to a source of a symmetrical three-phase voltage (not shown) for feeding an electric three-phase motor M. The three-phase source could be a main voltage or a three-phase voltage created by means of a voltage converter.

In series with line L1 there is connected anti-parallel semi-conductors V1 and V2, i.e., two semiconductors connected back-to-back in parallel. In the present example, the semiconductors are thyristors controlled by means of a control unit C so that they are switched between conducting and non-conducting states, as is conventional. This switching controls the voltage and the current provided to the motor M. The voltage created across these thyristors is designated U1 while the phase current is designated i1.

In parallel with the thyristors V1, V2 there is connected a voltage measuring device D1 having two inputs and one output. By connecting the inputs of the measuring device D1 to each side of the thyristors the voltage U1 is measured. The measuring device D1 provides at its output a digital signal X1 representing the measured voltage U1 as follows. When the voltage U1 across the thyristors V1, V2 is essentially zero, i.e., either when at least one of the thyristors is conducting or during a zero crossing of the phase voltage, then the signal X1 is a logic "1". In all other cases, i.e., when there is a voltage across the thyristors, the signal X1 is a logic "0". The signal X1 is forwarded to the control unit C.

Line L1 is connected to one of the phase terminals of the electric three-phase motor M.

For line L2, there are provided corresponding thyristors V3, V4 and a voltage measuring device D2 measuring the voltage U2 across the thyristors. The measuring device supplies the information of the voltage as a digital signal X2 to the control unit C. Line L2 is connected to a second one of the phase terminals of the motor M.

For line L3, no corresponding arrangement is provided. Instead, this line is connected directly to the third phase terminal of the motor M.

The operation of the motor will now be described with reference to FIGS. 2 and 3.

The signals X1 and X2 are used as references by the control unit C for firing of the thyristors, i.e., to make them conductive. The thyristors are fired at a firing angle "α", which in FIGS. 2 and 3 is calculated from the negative edge of the respective signal X1, X2. The voltages across the motor terminals are adjusted by adjusting the firing angle α; with a firing angle of 0 degrees, i.e., with the thyristors conducting all the time, the motor voltage is 100% of maximum and with a firing angle of 180 degrees, i.e., with the thyristors always non-conducting, the motor voltage is 0%. By gradually increasing or decreasing the firing angle α the voltage across the motor terminals is correspondingly adjusted.

Figure 2:
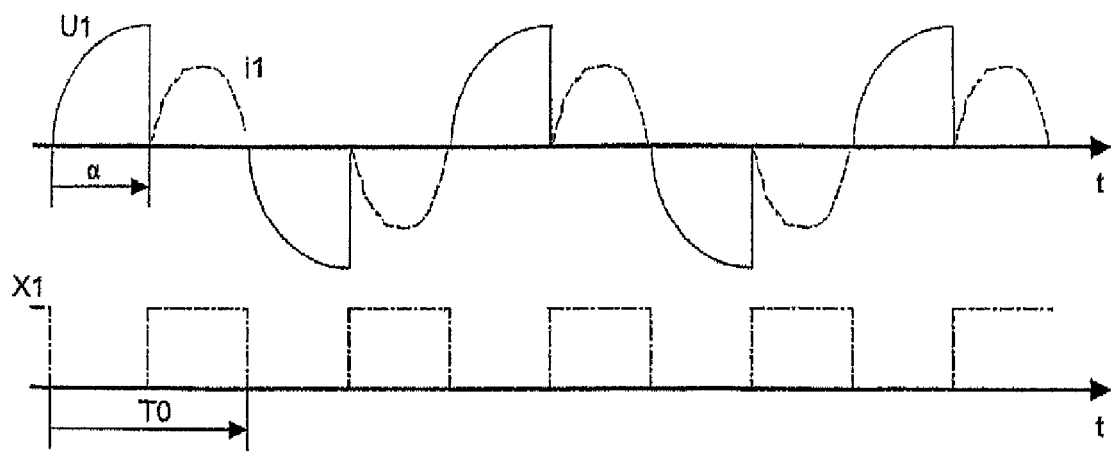
FIG. 2 is a time diagram showing motor voltage and current during normal operation of an electric motor according to the invention.
Figure 3:
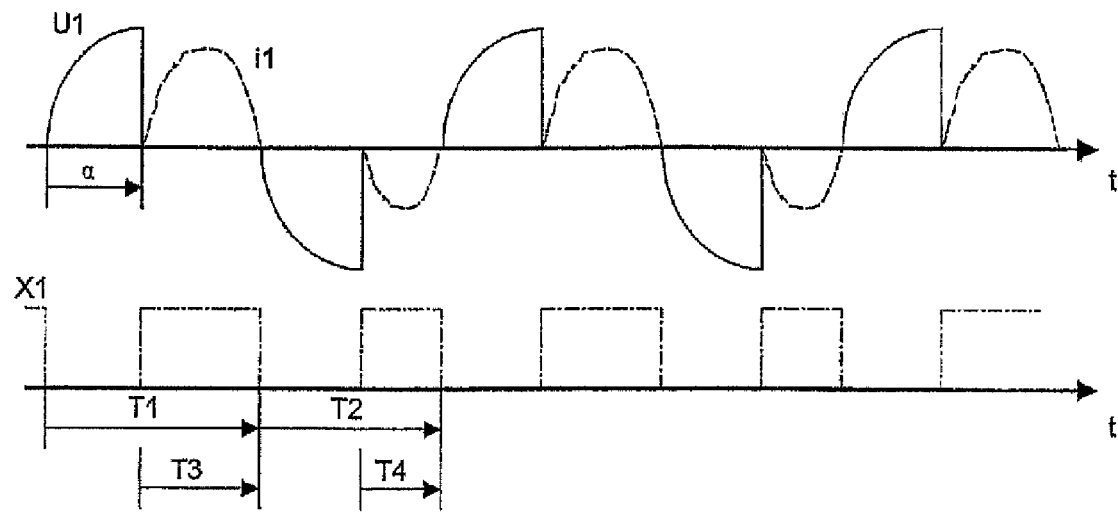
FIG. 3 is a time diagram showing motor voltage and current when a DC component appears during operation of an electric motor according to the invention.

As shown in FIG. 2, with no DC component present the period time T0 of the reference signals X1, X2 will be equal to half of the voltage period time. With a frequency of 50 Hz then T0 equals 10 milliseconds. This also means that the integral of the phase current over one voltage period is zero.

When a DC component appears, the shapes of the voltage and current curves change. This change will now be described with reference to FIG. 3, wherein a positive DC component has been introduced. Also, the time periods of the reference signals change. In FIG. 3, the first period after the appearance of the DC component is designated T1 while the second one is designated T2. With the positive DC component, T1>T0 while T2<T0. The appearance of a DC component can in this way be detected for example by means of T1 being longer than T2 or by detecting that T1 and T2 differ from T0. Alternatively, the conductive periods of the thyristors, designated T3 for the first period and T4 for the second period, can be analysed. The fact that T3>T4 indicates that a DC component is present.

DC components appear at certain firing angles α. With a large firing angle α and low applied motor voltage then only one thyristor at a time will be conductive. A current, i1 for phase L1 or i2 for phase L2, then flows between the phase having a conductive thyristor and the phase having no thyristors, i.e., line L3. As the voltage increases and the firing angle α decreases then at a certain upper firing angle α=a1 the currents i1 and i2 will begin to overlap, creating currents also between the two phases L1 and L2. With a firing angle α<a1 there is a risk of DC components. There is also a lower firing angle α=a2 below which the risk of DC components is removed. Consequently, there is a range a1<α<a2 in which there is a risk of DC components.

The values for a1 and a2 depend on among other parameters the commutation of the semiconductors and the impedance of the circuit. In a typical case then a1=45° and a2=90°.

During starting operation, when a DC component of the motor current has been discovered in the above mentioned firing range, the firing angle is immediately decreased, thus applying a larger voltage to the motor M. This in turn increases the torque and the controller will rapidly leave the firing angle range in which DC components appear. Control can thereafter return to normal operation when the DC component no longer is present.

By limiting the range in which DC components are checked for, more efficient control is provided. Also, the influence of interference will not initiate adjustment of firing angles.

Figure 4:
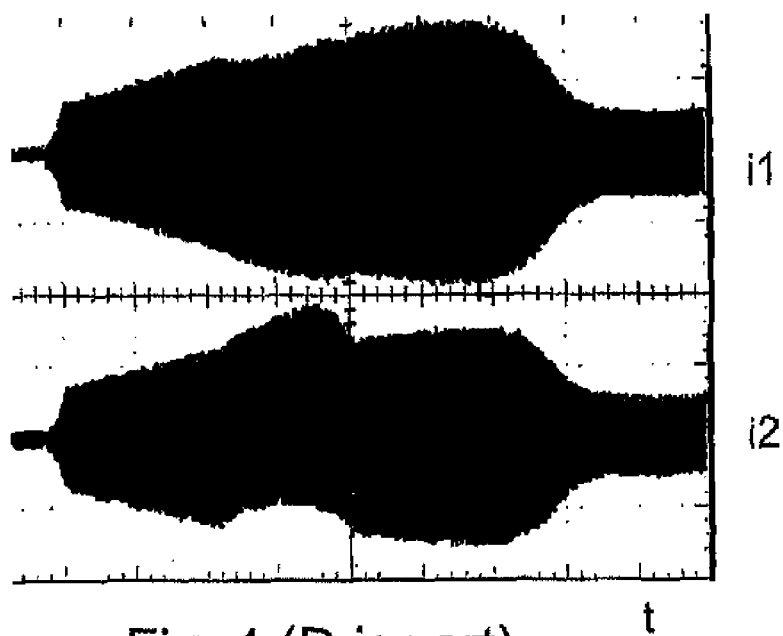
FIG. 4 is an oscilloscope diagram showing motor starting currents using prior art control.
Figure 5:
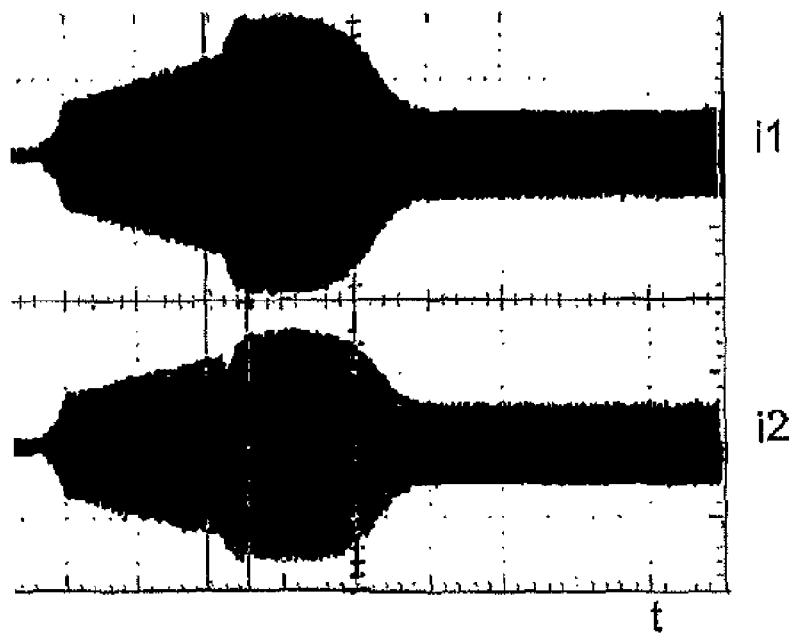
FIG. 5 is an oscilloscope diagram showing motor starting currents using a method according to the invention.

A comparison between prior art operation and operation according to the inventive method will now be made with reference to FIGS. 4 and 5. In FIG. 4, an oscilloscope diagram showing motor starting currents i1 and i2 using prior art control is shown. It can here be seen that the DC component remains for a substantial time. In FIG. 5, however, which is an oscilloscope diagram showing motor starting currents i1 and i2 using a method according to the invention, the DC component is rapidly eliminated by increasing the applied motor voltage. This results in a momentarily increased motor current, which after reaching full motor speed rapidly decreases to a normal operation current.

In case of stop operation, when a DC component in the motor current is found, the applied motor voltage is instead rapidly decreased, moving operation from the firing angle range in which DC components appear.

A preferred embodiment of a method of controlling a current of a three-phase electric motor according to the invention has been described. A person skilled in the art realises that this could be varied within the scope of the appended claims.

Self-commutating thyristors have been described as the preferred kind of semiconductor used in a controller implementing the method according to the invention. It will be appreciated that also other kinds of semi-conductors can be used, such as gate turnoff (GTO) thyristors.

The invention claimed is:

1. A method of controlling a current of a three-phase electric motor with a three-phase controller, wherein voltages of two of the three phases are controlled by adjusting firing angles of semiconductors provided in said phases, the method comprising:
    determining a possibility of DC components appearing in current supplied to the electric motor,
    adjusting the firing angles so as to leave a range of firing angles in which the DC components appear, and
    determining a range of firing angles in which DC components in current supplied to the electric motor are possible prior to adjusting the firing angles so as to leave said range of firing angles.

2. The method according to claim 1, wherein the range of firing angles is between 45° and 90°.

3. The method according to claim 2, further comprising:
    determining a range of firing angles in which DC components in current supplied to the electric motor are possible before searching for DC components, wherein the search for DC components is limited to said range of firing angles.

4. A method of controlling a current of a three-phase electric motor with a three-phase controller, wherein voltages of two of the three phases are controlled by adjusting firing angles of semiconductors provided in said phases, the method comprising:
    determining a possibility of DC components appearing in current supplied to the electric motor,
    adjusting the firing angles so as to leave a range of firing angles in which the DC components appear,
    searching for DC components during operation, and subsequent to having found a DC component, adjusting the firing angles so as to leave a range of firing angles in which the DC components appear.

5. The method according to claim 4, wherein searching for DC components comprises comparing the time period of successive non-conductive and conductive periods for the semiconductors with a predetermined value.

6. The method according to claim 4, wherein searching for DC components comprises comparing the time periods of successive non-conductive and conductive periods for the semiconductors with each other.

7. The method according to claim 4, wherein searching for DC components comprises comparing the time periods of two successive conductive periods of the semiconductors with each other.

8. A computer program product, comprising:
a non-transitory computer readable medium; and
computer program instructions recorded on the computer readable medium and executable by a processor for carrying out a method for controlling a three-phase motor, wherein voltages of two of the three phases are controlled by adjusting firing angles of semiconductors provided in said phases, the method comprising determining a possibility of DC components appearing in current supplied to the electric motor, adjusting the firing angles so as to leave a range of firing angles in which the DC components appear, and determining a range of firing angles in which DC components in current supplied to the electric motor are possible prior to adjusting the firing angles so as to leave said range of firing angles.

9. A computer program product, comprising:
a non-transitory computer readable medium; and
computer program instructions recorded on the computer readable medium and executable by a processor for carrying out a method for controlling a three-phase motor, wherein voltages of two of the three phases are controlled by adjusting firing angles of semiconductors provided in said phases, the method comprising determining a possibility of DC components appearing in current supplied to the electric motor, adjusting the firing angles so as to leave a range of firing angles in which the DC components appear, searching for DC components during operation, and subsequent to having found a DC component, adjusting the firing angles so as to leave a range of firing angles in which the DC components appear.

* * * * *